(12) United States Patent
Thompson et al.

(10) Patent No.: US 10,106,162 B2
(45) Date of Patent: Oct. 23, 2018

(54) METHODS AND SYSTEM FOR STARTING AN ENGINE

(71) Applicant: Ford Global Technologies, LLC, Dearborn, MI (US)

(72) Inventors: Scott James Thompson, Canton, MI (US); Todd McCullough, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 15/213,908

(22) Filed: Jul. 19, 2016

(65) Prior Publication Data

US 2018/0022353 A1    Jan. 25, 2018

(51) Int. Cl.
| | |
|---|---|
| *B60W 30/18* | (2012.01) |
| *B60W 10/02* | (2006.01) |
| *B60W 10/06* | (2006.01) |
| *B60W 20/00* | (2016.01) |
| *F02D 41/06* | (2006.01) |
| *F02D 41/26* | (2006.01) |
| *F02N 11/08* | (2006.01) |
| *B60K 6/387* | (2007.10) |
| *B60K 6/547* | (2007.10) |
| *B60W 10/08* | (2006.01) |
| *B60W 10/115* | (2012.01) |
| *B60W 30/194* | (2012.01) |

(Continued)

(52) U.S. Cl.
CPC ....... *B60W 30/18018* (2013.01); *B60K 6/387* (2013.01); *B60K 6/547* (2013.01); *B60W 10/02* (2013.01); *B60W 10/06* (2013.01); *B60W 10/08* (2013.01); *B60W 10/115* (2013.01); *B60W 20/00* (2013.01); *B60W 20/40* (2013.01); *B60W 30/194* (2013.01); *F02D 41/26* (2013.01); *F02N 11/04* (2013.01); *F02N 11/0822* (2013.01); *F02N 11/0851* (2013.01); *F16D 41/00* (2013.01); *B60K 2006/268* (2013.01); *B60K 2006/4825* (2013.01); *B60W 2510/082* (2013.01); *B60W 2510/087* (2013.01); *B60W 2510/108* (2013.01); *B60W 2510/244* (2013.01); *B60W 2510/246* (2013.01); *B60Y 2300/18016* (2013.01); *F02D 41/062* (2013.01); *F02N 15/022* (2013.01); *F02N 15/08* (2013.01); *F02N 2200/101* (2013.01); *Y10S 903/903* (2013.01)

(58) Field of Classification Search
CPC .......... B60W 30/18018; B60W 10/02; B60W 10/06; B60W 20/00; F02D 41/062; F02D 41/26; F02N 11/0851; B60Y 2300/18016; Y10S 903/903
USPC .......................................................... 701/22
See application file for complete search history.

(56) References Cited

U.S. PATENT DOCUMENTS

| | | |
|---|---|---|
| 9,068,546 B2 | 6/2015 | Gibson et al. |
| 2010/0087290 A1 | 4/2010 | Schoenek et al. |

(Continued)

*Primary Examiner* — Krishnan Ramesh
(74) *Attorney, Agent, or Firm* — David Kelley; McCoy Russell LLP

(57) ABSTRACT

Systems and methods for starting an engine of a hybrid powertrain or driveline that includes an engine and a driveline disconnect clutch are described. In one example, a motor/generator rotates one side of an open driveline disconnect clutch that is coupled to a transmission, and then closes the open driveline disconnect clutch in response to motor/generator acceleration being less than a threshold.

20 Claims, 5 Drawing Sheets

(51) Int. Cl.
  *F02N 11/04* (2006.01)
  *F16D 41/00* (2006.01)
  *B60W 20/40* (2016.01)
  *F02N 15/02* (2006.01)
  *F02N 15/08* (2006.01)
  *B60K 6/26* (2007.10)
  *B60K 6/48* (2007.10)

(56) References Cited

U.S. PATENT DOCUMENTS

| | | | |
|---|---|---|---|
| 2010/0178585 A1 | 7/2010 | Kuroda et al. | |
| 2013/0274969 A1* | 10/2013 | Wang | B60W 10/08 701/22 |
| 2014/0004997 A1* | 1/2014 | Wang | B60W 10/02 477/5 |
| 2014/0343771 A1* | 11/2014 | Kim | B60W 10/02 701/22 |
| 2015/0344026 A1 | 12/2015 | Gibson et al. | |
| 2016/0059846 A1* | 3/2016 | Wang | B60W 20/40 477/5 |

* cited by examiner

METHODS AND SYSTEM FOR STARTING AN ENGINE

FIELD

The present description relates to methods and a system for operating a powertrain of a hybrid vehicle. The methods and systems may be particularly useful for hybrid vehicles that include a driveline disconnect clutch positioned between an engine and a motor/generator.

BACKGROUND AND SUMMARY

An internal combustion engine of a hybrid vehicle may be started in several ways. For example, an engine may be started via a low voltage starter motor, a belt integrated starter/generator (BISG), or a driveline integrated starter/generator (ISG) that is incorporated into a driveline or powertrain of the hybrid vehicle. However, a low voltage starter motor may unnecessarily increase vehicle cost since the hybrid vehicle may already include a BISG and/or an ISG. Consequently, the hybrid vehicle may be produced with a BISG, BISG and ISG, or only an ISG to start the engine.

At lower ambient temperatures, the hybrid vehicle's available battery output power (e.g., a maximum amount of electrical power the battery may output or source) may be significantly reduced. Further, rotating the engine via the ISG at a desired cranking speed at a low ambient temperature may use significantly more power as compared to rotating the same engine at the desired cranking speed via the ISG at a higher ambient temperature. The hybrid vehicle's battery output power at lower ambient temperature may be insufficient to provide the power to rotate the engine via the ISG at the desired cranking speed at low ambient temperatures.

Likewise, the battery may not have sufficient output to crank the engine via the BISG at lower ambient temperatures. Further, even if the battery has sufficient power to crank the engine at lower ambient temperatures, the BISG may not be able to crank the engine at a desired speed due to belt slippage and capacity of the BISG to rotate the engine at the desired cranking speed at low ambient temperatures.

The inventors herein have recognized the above-mentioned issues and have developed a powertrain operating method, comprising: commanding a motor to a speed via a controller in response to an engine start request; and closing a driveline disconnect clutch via the controller in response to acceleration of the motor being less than a threshold after commanding the motor to the speed.

By commanding a motor to a speed in response to an engine start request and closing a driveline disconnect clutch in response to acceleration of the motor being less than a threshold after commanding the motor to the speed, it may be possible to provide the technical result of starting an engine of a hybrid vehicle at low ambient temperatures. In particular, the motor may be accelerated to a higher speed as compared to if the motor where coupled to the engine and then accelerated. The motor may achieve its maximum speed at its present operating conditions when motor acceleration is less than a threshold. Then, the driveline disconnect clutch may be closed rapidly to transfer kinetic energy and torque from the motor to the engine. The transfer of kinetic energy and torque to the engine accelerates the engine to a higher cranking speed as compared to if the motor and engine were accelerated from zero speed at a same time. Consequently, the engine may be started even when battery output power is reduced due to low ambient temperatures. Further, energy transfer across the driveline disconnect clutch may result in higher energy transfer efficiency as compared to rotating the engine via the BISG.

The present description may provide several advantages. Specifically, the approach may increase the possibility of starting an engine at low ambient temperatures. Further, the approach may provide a useful way to start an engine during conditions of degraded systems. Further still, the approach may reduce the possibility of engine starting system degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
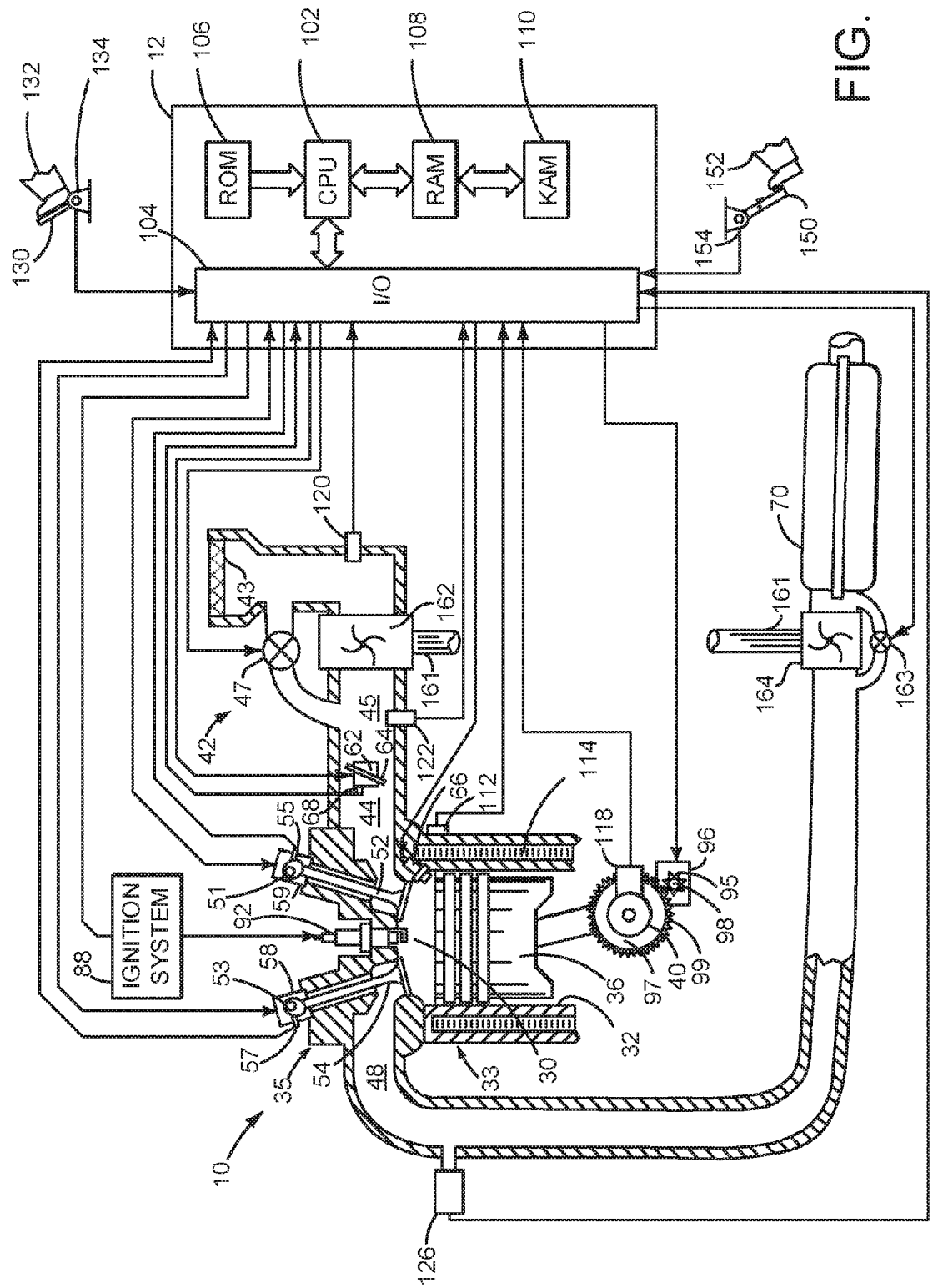
FIG. 1 is a schematic diagram of an engine.
Figure 2:
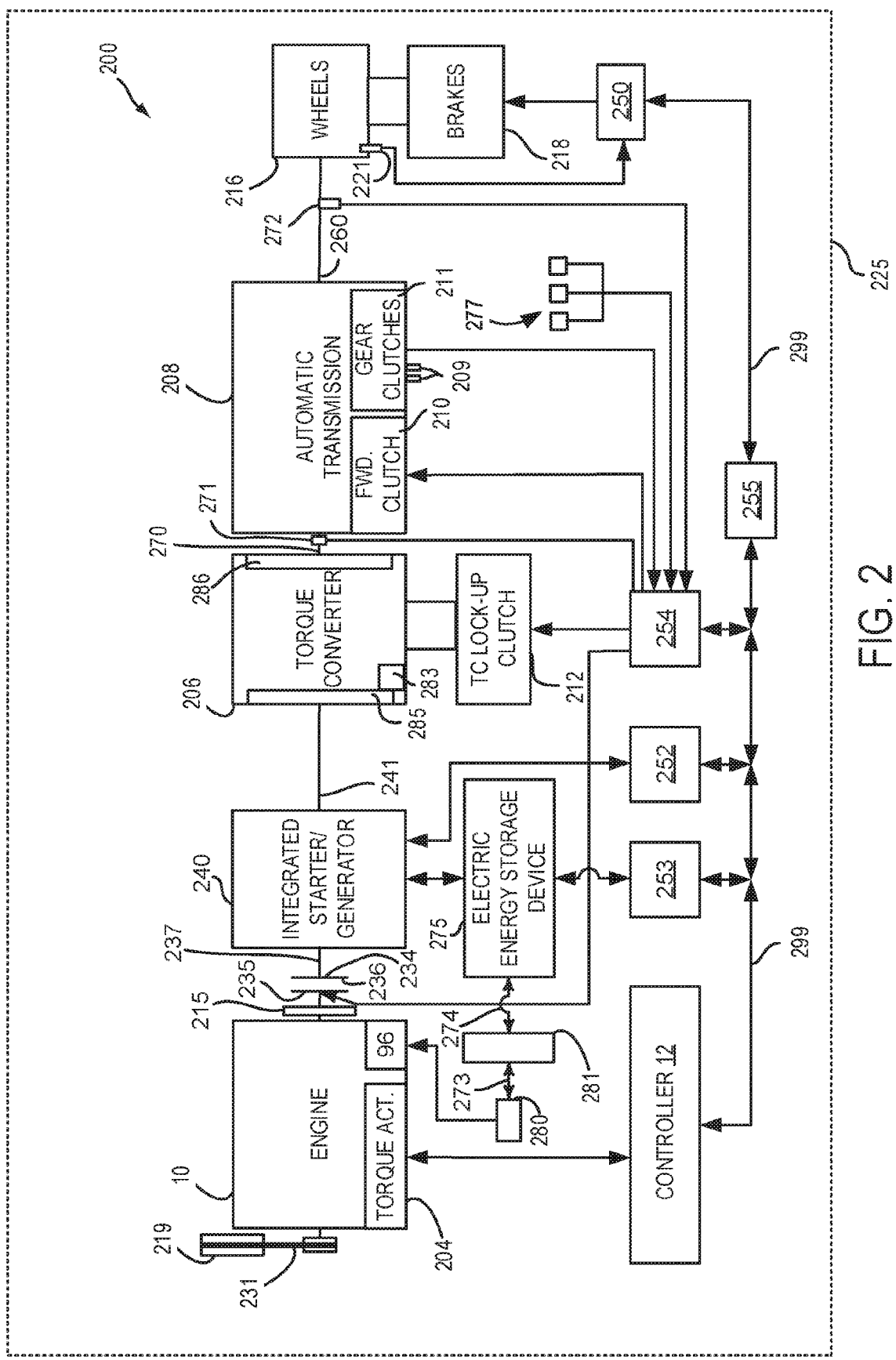
FIG. 2 is a schematic diagram of a hybrid vehicle driveline.

The present description is related to starting an internal combustion engine of a hybrid vehicle. The driveline may include an engine, motor, and a disconnect clutch. The hybrid vehicle may include an engine as is shown in FIG. 1. The engine of FIG. 1 may be included in a driveline as is shown in FIG. 2. The system of FIGS. 1 and 2 may provide the operating sequence shown in FIG. 3. The method of FIGS. 4 and 5 may be included in the system of FIGS. 1 and 2 to provide the operating sequence illustrated in FIG. 3.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as a motor/generator. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vise-versa. Low voltage battery 280 is electrically coupled to low voltage buss 273. Electric energy storage device 280 is electrically coupled to high voltage buss 274. Low voltage battery 280 selectively supplies electrical energy to starter motor 96.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a system, comprising: an engine; a transmission coupled to the engine; a first motor/generator coupled to the engine via a belt; a second motor/generator positioned in a driveline between the engine and the transmission; a disconnect clutch positioned in a driveline between the engine and the second motor/generator; an electric energy storage device electrically coupled to the second motor/generator; and a vehicle system controller including executable instructions stored in non-transitory memory to start the engine in a first mode via closing the driveline disconnect clutch in response to a the electrical energy storage device supplying power to the second motor/generator at a maximum power output limit of the electrical energy storage device and speed of the second motor/generator being within a threshold speed of a maximum speed of the second motor/generator when the second motor/generator is supplied electrical power at the maximum power output limit of the electrical energy storage device.

The system further comprises additional instructions to activate the first mode in response to a temperature less than a threshold. The system further comprises additional instructions to start the engine in a second mode via rotating the first motor/generator. The system further comprises additional instructions to start the engine in the first mode in response to degradation of the first motor/generator. The system further comprises additional instructions to start the engine in the first mode in response to degradation of the electric energy storage device.

Figure 3:
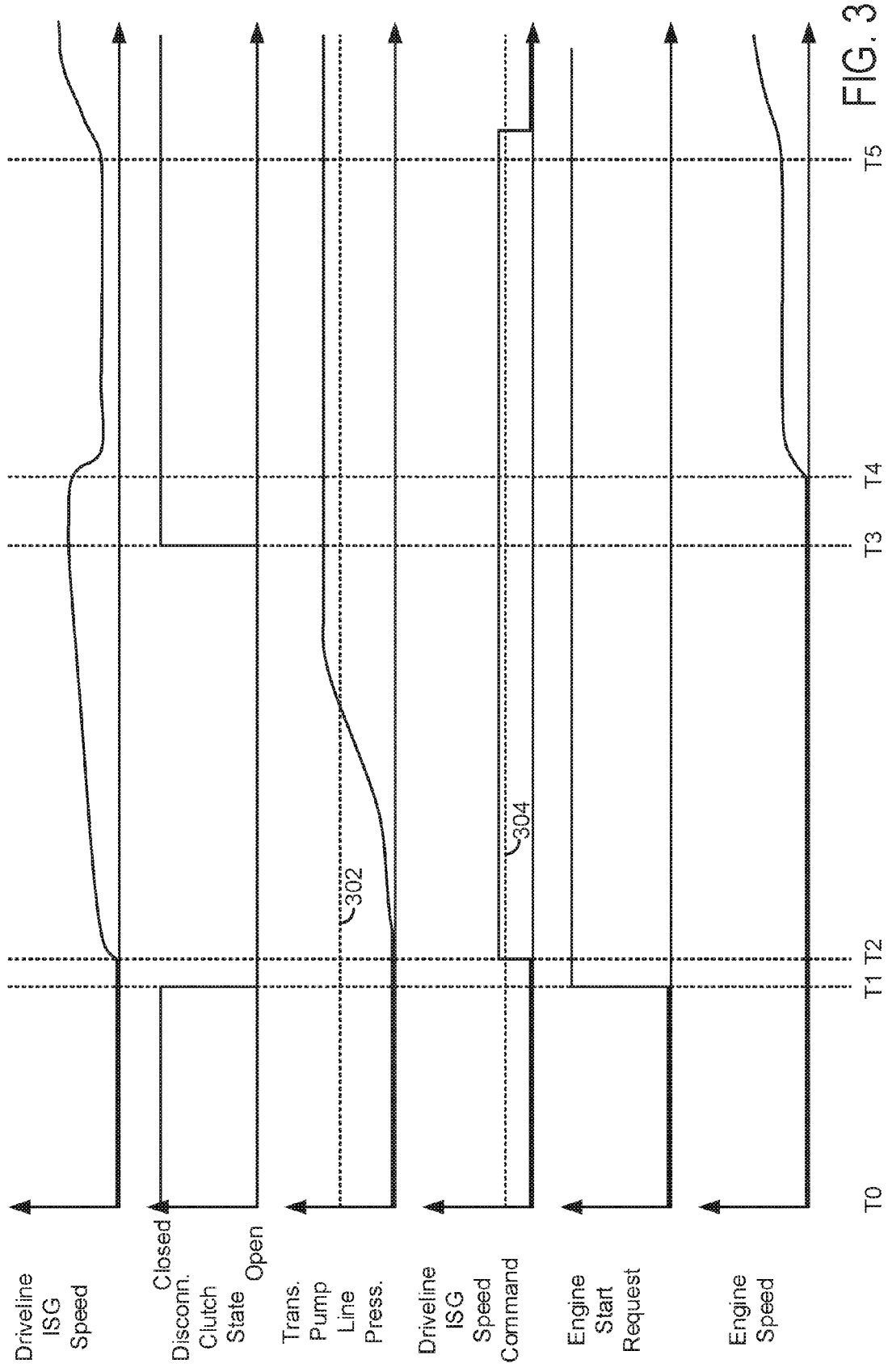
FIG. 3 shows an example driveline operating sequence according to the method of FIGS. 4 and 5.

Referring now to FIG. 3, example plots of a vehicle operating sequence are shown. The operating sequence may be performed via the system of FIGS. 1 and 2 in cooperation with the method of FIGS. 4 and 5. Vertical lines at times T0-T5 represent times of interest during the sequence. The plots in FIG. 3 are time aligned and occur at the same time.

The first plot from the top of FIG. 3 is a plot of driveline ISG speed (e.g., speed of ISG 240 shown in FIG. 2) versus time. The vertical axis represents driveline ISG speed and driveline ISG speed increases in the direction of the vertical axis arrow. The horizontal axis represents time and time increases from the left side of the figure to the right side of the figure.

The second plot from the top of FIG. 3 is a plot of driveline disconnect operating state versus time. The driveline disconnect clutch is fully closed when the trace is at a higher level near the vertical axis arrow. The driveline disconnect clutch is fully open when the trace is at a lower level near the horizontal axis. The driveline disconnect clutch torque capacity is an amount of torque the driveline disconnect clutch may transfer from one side of the driveline disconnect clutch to the other side of the driveline disconnect clutch. The driveline disconnect clutch torque capacity is near zero (e.g., less than 10 N-m) when the driveline disconnect clutch is fully open. The driveline disconnect clutch torque capacity is its rated torque capacity (e.g., a maximum amount of torque the disconnect clutch may transfer when fully locked closed) when the driveline disconnect clutch is fully closed. The driveline disconnect clutch torque capacity may be varied from near zero to its rated capacity via adjusting a force or pressure applied to close the driveline disconnect clutch.

The third plot from the top of FIG. 3 is a plot of transmission pump output line pressure versus time. The transmission output line pressure increases in the direction of the vertical axis arrow. The horizontal axis represents time and time increases from the left side of the figure to the right side of the figure. Horizontal line 302 represents a threshold transmission line output pressure below which the driveline disconnect clutch is not closed during engine starting. In one example, threshold 302 also represents a transmission line pressure corresponding to a torque capacity of the driveline disconnect clutch to rotate the engine at a desired cranking speed, which may be less than the rated or maximum driveline disconnect clutch torque capacity.

The fourth plot from the top of FIG. 3 is a plot of a driveline ISG speed command versus time. The vertical axis represents the driveline ISG speed command and the commanded driveline ISG speed increases in the direction of the vertical axis arrow. The horizontal axis represents time and time increases from the left side of the figure to the right side of the figure. Horizontal line 304 represents a speed that the driveline ISG may achieve at present operating conditions when supplied with the available amount of power from the electric energy storage device.

The fifth plot from the top of FIG. 3 is a plot of an engine start request versus time. The vertical axis represents engine start request. The engine start request is asserted when the trace is near the vertical axis arrow. The engine start request is not asserted when the trace is near the horizontal axis. The horizontal axis represents time and time increases from the left side of the figure to the right side of the figure.

The sixth plot from the top of FIG. 3 is a plot of engine speed versus time. The vertical axis represents engine speed and engine speed increases in the direction of the vertical axis arrow. The horizontal axis represents time and time increases from the left side of the figure to the right side of the figure.

At time T0, engine speed is zero indicating that the engine is not rotating. Further, the engine start request is not asserted so the engine is not requested to be started. The driveline ISG speed is also zero indicating ISG rotation has ceased. The transmission pump output line pressure is zero and the driveline ISG speed command is zero. The driveline disconnect clutch is closed. The vehicle may be stopped during such conditions. Further, the ambient temperature is less than a threshold (not shown), ISG winding temperature is less than a threshold (not shown), engine temperature is less than a threshold (not shown), and conditions of vehicle degradation are not asserted (not shown).

At time T1, the engine start request is asserted as is indicated by the engine start request transitioning from a lower level to a higher level. The driveline disconnect clutch is fully opened in response to the engine start request as indicated by the driveline disconnect clutch state trace transitioning from a lower level to a higher level. The ISG speed remains zero and engine speed remains zero. The transmission line pressure is also low. The driveline ISG sped command is zero.

At time T2, the driveline ISG speed command transitions from a first value to a second value in a step-wise fashion in response to the engine start request. For example, during a first cycle of the vehicle system controller in which command and control routines within the vehicle system controller are called and executed, the driveline ISG speed command is a first value. The ISG speed command is changed to a second value during a second cycle of the vehicle system controller. No driveline ISG speed commands are output between the first cycle of the vehicle system controller and a second cycle of the vehicle system controller. The time between vehicle system controller cycles may be short (e.g., less than 5 milliseconds). The driveline ISG speed command is sent to the driveline ISG and the driveline ISG follows the driveline ISG speed command. The driveline ISG is operated in a speed control mode while responding to the driveline ISG speed command. In driveline ISG speed control mode, driveline ISG torque is adjusted so that driveline ISG speed follows and/or matches the driveline ISG speed command. Thus, driveline ISG torque is adjusted to provide the commanded driveline ISG speed.

In one example, the driveline ISG speed command ISG speed value is based on an amount of available power the electric energy storage device may provide (e.g., a maximum power output amount of the electric energy storage device) to power consumers (e.g., the driveline ISG). The available power of the electric energy storage device may be based on an amount of charge stored in the electric energy storage device, electric energy storage device temperature, and other conditions. For example, a battery state of charge may be determined and it is used to index a table or function of empirically determined maximum battery output power values. The table or function outputs an available amount of power the electric energy storage device may source to electrical power consumers at the present vehicle operating conditions. The amount of available power the electric energy storage device may source along with driveline ISG winding temperature is used to index a table or function of empirically determined driveline ISG speed values. The table or function outputs the a maximum speed that the driveline ISG may achieve when the driveline ISG is decoupled from the engine, while the transmission is in park or neutral, and when the available power of the electric energy storage device is supplied to the driveline ISG. An offset value (e.g., 200 RPM) is added to the maximum speed that the driveline ISG may achieve when the driveline ISG is supplied the available power at present conditions so that the driveline ISG has little chance of achieving the commanded driveline ISG speed. In this way, the driveline ISG is commanded to a speed greater than the greatest speed the driveline ISG may achieve based on the available amount of power the electric energy storage device may source to the driveline ISG. Engine starting time may be reduced in this way.

In an alternative example, the driveline ISG may be controlled in a torque mode where driveline ISG torque follows a commanded driveline ISG torque and driveline ISG speed changes depending on the driveline ISG torque. For example, a driveline ISG torque command ISG torque value is based on an amount of available power the electric energy storage device may provide (e.g., a maximum power output amount of the electric energy storage device) to power consumers (e.g., the driveline ISG). The available power of the electric energy storage device may be based on an amount of charge stored in the electric energy storage device, electric energy storage device temperature, and other conditions. In one example, a battery state of charge is determined, and it is used to index a table or function of empirically determined maximum battery output power values. The table or function outputs an available amount of power the electric energy storage device may source to electrical power consumers at the present vehicle operating conditions. The amount of available power the electric energy storage device may source along with driveline ISG winding temperature is used to index a table or function of empirically determined driveline ISG torque values. The table or function outputs the a maximum torque that the driveline ISG may achieve when the driveline ISG is decoupled from the engine, and while the transmission is in park or neutral, when the available power of the electric energy storage device is supplied to the driveline ISG. An offset value (e.g., 20 N-m) is added to the maximum torque that the driveline ISG may achieve when the driveline ISG is supplied the available power at present conditions so that the driveline ISG has little chance of achieving the commanded driveline ISG torque. In this way, the driveline ISG is commanded to the greatest torque the driveline ISG may achieve based on the available amount of power the electric energy storage device may source to the driveline ISG.

The driveline ISG speed begins to increase in response to the driveline ISG speed command. The driveline disconnect clutch remains fully open and the transmission fluid pump output line pressure is low. The engine is not rotating.

Between time T2 and time T3, the driveline ISG accelerates toward the commanded driveline ISG speed while being supplied electrical power at the amount of available power from the electric energy storage device. The transmission pump output line pressure increases above threshold 302 in response to the increasing driveline ISG speed since it is driven via the torque converter impeller which is coupled to the driveline ISG. The engine speed remains zero and the driveline disconnect clutch remains fully open.

At time T3, acceleration of the driveline ISG slows to less than a threshold as indicated by driveline ISG speed increasing at a slow rate. The transmission output line pressure is greater than threshold 302. The driveline disconnect clutch is commanded fully closed in response to the acceleration of the driveline ISG being less than the threshold and the transmission line pressure being greater than threshold 302. The driveline disconnect clutch is commanded from fully open to fully closed in one cycle of the transmission controller such that the driveline disconnect clutch command is a step-wise command from a first driveline disconnect clutch torque capacity (e.g., 0) to a second driveline disconnect clutch torque capacity (e.g., 400 N-m). The rapid rate of driveline disconnect clutch closing transfers an increased amount of kinetic energy from the driveline ISG to the engine so that the engine accelerates to cranking speed.

At time T4, the driveline disconnect clutch closes so that engine speed begins to increase. Further, driveline ISG speed begins to decrease since the load applied to the driveline ISG increases. The driveline ISG speed command remains at a high level so that the available amount of electric energy power continues to flow to the driveline ISG. Alternatively, the driveline ISG may be commanded to a desired engine cranking speed.

Between time T4 and time T5, spark and fuel are supplied to the engine. The engine rotates and combustion within the engine is initiated.

At time T5, combustion in the engine accelerates the engine and the engine and driveline ISG accelerate toward a desired engine speed (e.g., idle speed). In this example, the driveline ISG is turned off after the engine accelerates above the commanded driveline ISG speed.

In this way, kinetic energy of a driveline ISG is converted to torque to rotate an engine during select operating conditions. Further, torque from the driveline ISG is used to accelerate the engine to cranking speed so that the engine may be started.

Figure 4:
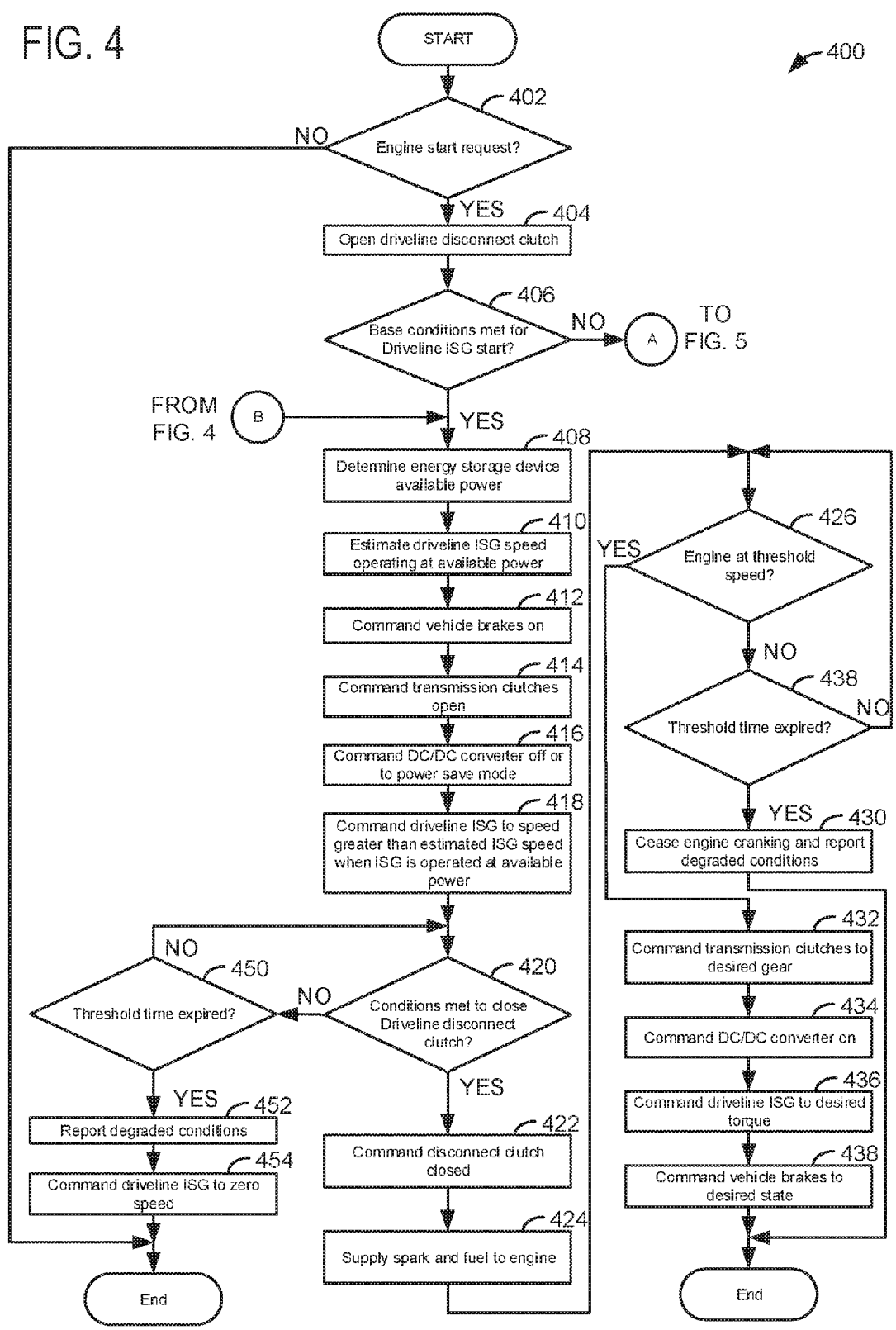
FIGS. 4 and 5 describe a method for operating a driveline of a hybrid vehicle.
Figure 5:
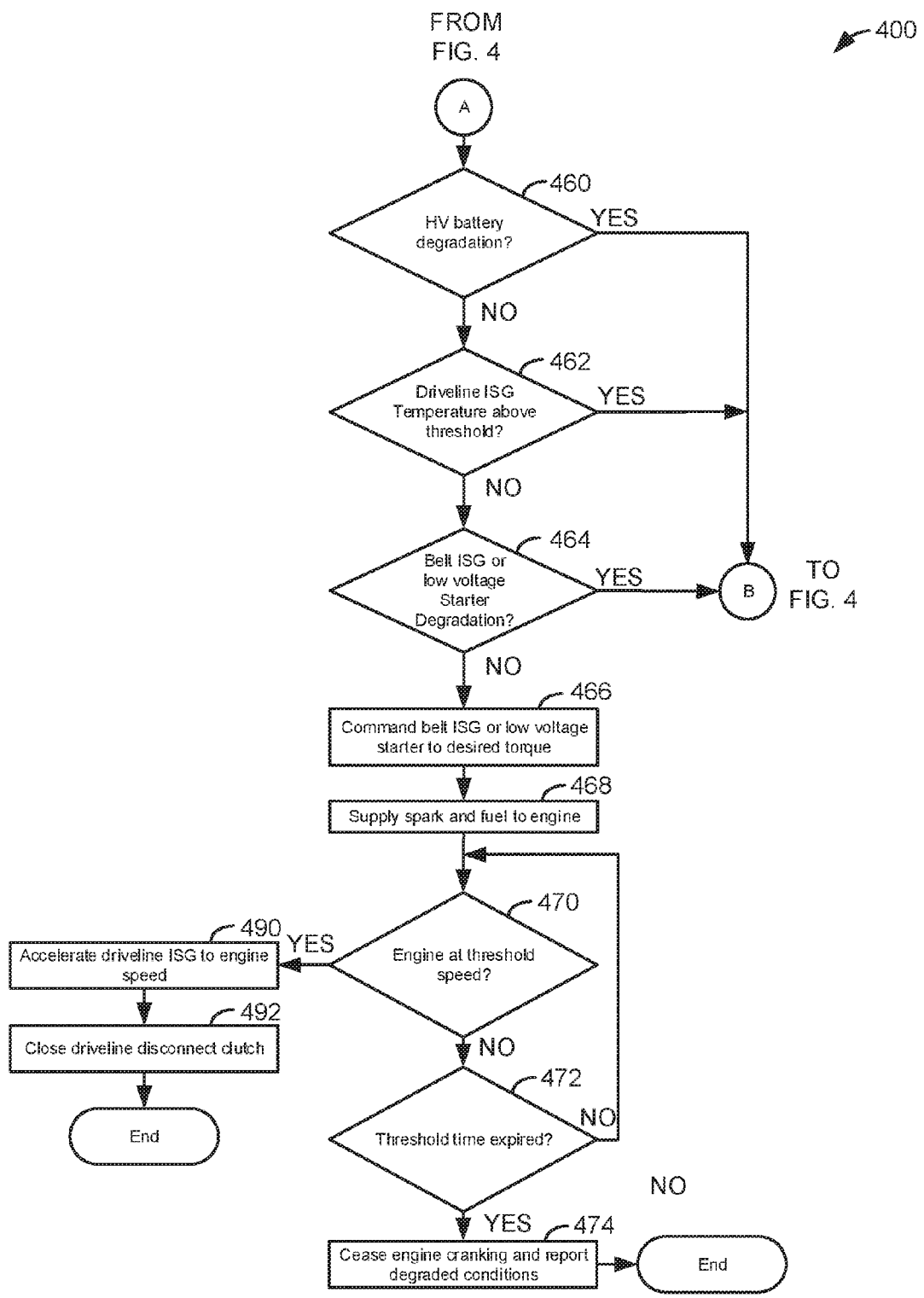

Referring now to FIGS. 4 and 5, an example flow chart for a method for operating a hybrid vehicle driveline is shown. The method of FIGS. 4 and 5 may be incorporated into and may cooperate with the system of FIGS. 1 and 2. Further, at least portions of the method of FIGS. 4 and 5 may be incorporated as executable instructions stored in non-transitory memory while other portions of the method may be performed via a controller transforming operating states of devices and actuators in the physical world.

At 402, method 400 judges if an engine start is requested. An engine start may be requested by a vehicle operator or a vehicle controller. For example, a driver may turn a key or apply a pushbutton to request an engine start. An engine controller may automatically request an engine start in response to a low battery state of charge, increase in driver demand torque, or other vehicle conditions. If method 400 judges that an engine start request is present, the answer is yes and method 400 proceeds to 404. Otherwise, the answer is no and method 400 proceeds to exit.

At 404, method 400 opens the driveline disconnect clutch by commanding the driveline disconnect clutch to open. The driveline disconnect clutch may be opened via hydraulic pressure, spring force, or an electrical actuator. Method 400 proceeds to 406 after the driveline disconnect clutch is opened.

At 406, method 400 judges if base conditions for starting the engine via the driveline ISG are met. In one example, the base conditions for starting the engine via the driveline ISG may include but are not limited to a temperature of a high voltage battery being less than a threshold temperature, temperature of driveline ISG windings being less than a threshold temperature, vehicle speed equal zero, and an engine temperature less than a threshold temperature. In alternative examples, the engine may be started via the driveline ISG during all engine starts when vehicle speed is zero. If method 400 judges that the base conditions for starting the engine via the driveline ISG are present, the answer is yes and method 400 proceeds to 408. Otherwise, the answer is no and method 400 proceeds to 460 of FIG. 5.

At 408, method 400 determines the available power of the electric energy storage device. In one example, the electric energy storage device controller determines battery state of charge, battery temperature, and other conditions that affect the available power of the electric energy storage device. For example, a battery state of charge may be determined and it is used to index a table or function of empirically determined maximum battery output power values. The table or function outputs an available amount of power the electric energy storage device may source to electrical power consumers at the present vehicle operating conditions. The electric energy storage device controller provides this information to the vehicle system controller and the vehicle system controller may send the information to the electric machine controller (e.g., driveline ISG controller). Method 400 proceeds to 410 after the available power of the electric energy storage device is determined.

At 410, method 400 estimates a speed that the driveline ISG may achieve when supplied the available power of the electric energy storage device. In one example, the amount of available power the electric energy storage device may source along with driveline ISG winding temperature is used to index a table or function of empirically determined driveline ISG speed values. The table or function outputs the a maximum speed that the driveline ISG may achieve when the driveline ISG is decoupled from the engine, while the transmission is in park or neutral, and when the available power of the electric energy storage device is supplied to the driveline ISG. An offset value (e.g., 200 RPM) is added to the maximum speed that the driveline ISG may achieve when the driveline ISG is supplied the available power from the electric energy storage device at present conditions to produce a desired or commanded driveline ISG speed. Increasing the commanded driveline ISG speed makes chances of achieving the commanded driveline ISG speed remote, but it may maximize power delivered to the driveline ISG to increase the driveline ISG kinetic energy. Alternatively, the driveline ISG speed may be commanded to a value that is greater than a desired engine cranking speed. By increasing driveline ISG speed to a speed greater than a desired cranking speed, the driveline ISG kinetic energy may be increased so that the engine has a better chance of achieving the desired engine cranking speed when the driveline disconnect clutch is closed. This optional strategy may be utilized when ambient temperatures are not cold. Method 400 proceeds to 412.

At 412, method 400 commands vehicle brakes to be applied if the vehicle transmission is in neutral. Commanding the vehicle brakes applied may limit vehicle movement. Method 400 proceeds to 414.

At 414, method 400 commands transmission clutches open. In particular, the transmission forward clutch and gear clutches are commanded open so that more fluid from the transmission pump may be supplied to the driveline disconnect clutch during driveline disconnect clutch closing. Consequently, the amount of time to close the driveline disconnect clutch may be reduced. Method 400 proceeds to 416.

At 416, method 400 commands the DC/DC converter to an off or power saving state. By commanding the DC/DC converter off, additional power from the electric energy storage device may be directed to the driveline ISG, thereby potentially increasing the driveline ISG speed when the driveline ISG is activated. Method 400 proceeds to 418.

At 418, method 400 commands the driveline ISG to the speed to the maximum speed that the driveline ISG may achieve when the driveline ISG is supplied the available power from the electric energy storage device at present conditions operates plus the offset speed. Alternatively, the driveline ISG may be commanded to a speed that is greater than a desired engine cranking speed. The driveline ISG speed is increased to achieve the commanded driveline ISG speed.

At 420, method 400 judges if conditions are met to close the driveline disconnect clutch. In a first example, the conditions to close the driveline disconnect clutch are that transmission pump outlet line pressure is greater than a threshold pressure and driveline ISG acceleration is less than a threshold acceleration a predetermined amount of time after commanding the driveline ISG to a speed greater than a desired engine cranking speed or a speed greater than a speed the driveline ISG achieves when supplied with the available power from the electric energy storage device. The line pressure threshold may be based on a driveline disconnect clutch torque capacity to rotate the engine at a desired cranking speed. For example, it may be empirically determined that X kPa of fluid pressure need be supplied to the driveline disconnect clutch to rotate the engine at a desired engine cranking speed. Therefore, a pump outlet pressure of X kPa or greater may be the basis for closing the driveline disconnect clutch. In a second example, the conditions to close the driveline disconnect clutch are that the transmission pump outlet line pressure is greater than a threshold pressure and driveline ISG speed is within a threshold speed of a commanded driveline ISG speed, the commanded driveline ISG speed greater than a desired engine cranking speed. If method 400 judges that conditions in the first or second example are met, the answer is yes and method 400 proceeds to 422. Otherwise, method 400 proceeds to 450.

At 422, method 400 commands the driveline disconnect clutch closed. The driveline disconnect clutch may be commanded to the disconnect clutch's rated torque capacity to transfer as much of the driveline ISG's kinetic energy to the engine as possible, thereby accelerating the engine. Further, the driveline disconnect clutch may be closed according to a step-wise change in the commanded driveline disconnect clutch torque capacity (e.g., a driveline disconnect clutch torque capacity command is changed from a value of zero to rated disconnect clutch torque capacity in one operating cycle of a transmission controller. Additionally, method 400 may command the driveline ISG to a desired engine cranking speed a predetermined amount of time after commanding the driveline disconnect clutch closed. By commanding the driveline ISG speed to the desired engine cranking speed, the engine may be cranked at the desired speed after it is accelerated due to kinetic energy transfer from the driveline ISG to the engine. Method 400 proceeds to 424.

At 424, method 400 supplies spark and fuel to the engine. By supplying spark and fuel to the engine, combustion within engine cylinders may commence. Method 400 proceeds to 426.

At 426, method 400 judges whether or not the engine has achieved a threshold speed (e.g., an engine idle speed). If so, method 400 proceeds to 432. If not, method 400 proceeds to 438.

At 438, method 400 judges whether or not a threshold amount of time has expired since spark and fuel were supplied to the engine at 424. If so, method 400 proceeds to 430. Otherwise, method 400 returns to 426.

At 430, method 400 ceases engine cranking by commanding driveline ISG speed to zero. Further, fuel and spark delivery to the engine ceases. Method 400 may also report degraded engine starting condition to a human/machine interface. In this way, method 400 may prevent excessive engine cranking so that several engine cranking attempts may be made if the engine does not start. Method 400 proceeds to exit.

At 432, method 400 commands transmission clutches to engage a desired gear. For example, if the transmission gear selector is in drive, first gear of the transmission may be engaged by closing selected transmission clutches. If the transmission is in park, the transmission clutches may be held open. Method 400 proceeds to 434.

At 434, method 400 commands the DC/DC converter to an on state. Electrical power may be transferred between the low voltage buss and the high voltage buss when the DC/DC converter is activated. Method 400 proceeds to 436.

At 436, method 400 commands the driveline ISG to a desired torque. In one example, the driveline ISG may be commanded to a torque based on accelerator pedal position and vehicle speed. Thus, method 400 transitions the driveline ISG from a speed control mode during engine cranking to a torque control mode after the engine is started. Method 400 proceeds to 438.

At 438, method 400 commands the vehicle brakes to a desired state. For example, the vehicle brakes may be commanded off if the vehicle drive applies the accelerator pedal. Method 400 proceeds to exit.

At 450, method 400 judges whether or not a threshold amount of time has expired since the driveline ISG has been commanded to a speed. If so, method 400 proceeds to 452. Otherwise, method 400 returns to 420.

At 452, method 400 reports degraded engine starting conditions to a human/machine interface. Method 400 may report that conditions for closing the driveline disconnect clutch were not met. Method 400 proceeds to 454.

At 454, method 400 commands the driveline ISG speed to zero. Method 400 commands the driveline ISG speed to zero so that energy may be conserved while the vehicle's occupants attempt to alter vehicle conditions so that the driveline disconnect clutch may be closed. Method 400 proceeds to exit.

At 460, method 400 judges whether or not the high voltage battery or electric energy storage device and its controller are experiencing degraded operating conditions. Degraded operating conditions may include but are not limited to low battery voltage, degraded battery cells, battery temperature greater than a threshold, and low available battery power output. If method 400 judges that degraded conditions are present, the answer is yes and method 400 proceeds to 408 so that the engine may be started via the driveline ISG rather than by the BISG. Otherwise, the answer is no and method 400 proceeds to 462.

At 462, method 400 judges whether or not a driveline ISG temperature is greater than a threshold temperature. If method 400 judges that a driveline ISG temperature is greater than a threshold temperature, the answer is yes and method 400 proceeds to 408 so that the engine may be started via the driveline ISG rather than by the BISG. Otherwise, the answer is no and method 400 proceeds to 464.

At 464, method 400 judges whether or not a BISG or low voltage starter degradation is present. Method 400 may judge BISG degradation is present if the BISG fails to rotate or if a temperature of the BISG is greater than a threshold. Likewise, method 400 may judge low voltage starter degradation is present if the low voltage starter fails to rotate or low voltage starter temperature is greater than a threshold. If method 400 judges that a BISG or low voltage starter degradation is present, the answer is yes and method 400 proceeds to 408 so that the engine may be started via the driveline ISG rather than by the BISG. Otherwise, the answer is no and method 400 proceeds to 470.

At 470, method 400 commands the BISG or low voltage starter to a desired torque. In one example, the desired torque is a torque that provides a desired engine cranking speed. The engine rotates when the torque is supplied by the BISG or the low voltage starter to the engine. Method 400 proceeds to 472.

At 472, method 400 supplies spark and fuel to the engine. By supplying spark and fuel to the engine, combustion within engine cylinders may commence. Method 400 proceeds to 474.

At 474, method 400 judges whether or not the engine has achieved a threshold speed (e.g., an engine idle speed). If so, the answer is yes and method 400 proceeds to 490. If not, the answer is no and method 400 proceeds to 476.

At 490, method 400 accelerates the driveline ISG to engine speed by commanding the driveline ISG to the present engine speed in a speed control mode. Method 400 proceeds to 492.

At 492, method 400 closes the driveline disconnect clutch and changes from operating the driveline ISG in a speed control mode to operating the driveline ISG in a torque control mode.

At 476, method 400 judges whether or not a threshold amount of time has expired since spark and fuel were supplied to the engine at 472. If so, the answer is yes and method 400 proceeds to 478. Otherwise, the answer is no and method 400 returns to 474.

At 478, method 400 ceases engine cranking by commanding BISG speed to zero or commanding the low voltage starter off. Further, fuel and spark delivery to the engine ceases. Method 400 may also report degraded engine starting condition to a human/machine interface. In this way, method 400 may prevent excessive engine cranking so that several engine cranking attempts may be made if the engine does not start. Method 400 proceeds to exit.

Thus, the method of FIGS. 4 and 5 provides for a powertrain operating method, comprising: commanding a motor to a speed via a controller in response to an engine start request; and closing a driveline disconnect clutch via the controller in response to acceleration of the motor being less than a threshold after commanding the motor to the speed. The method further comprises commanding gear clutches of a transmission to an open state in response to the engine start request. The method further comprises deactivating an electrical device in response to the engine start request. The method includes where the electrical device is a DC/DC converter. The method further comprises closing the driveline disconnect clutch in further response to a line pressure output from a transmission pump exceeding a threshold pressure. The method includes where the threshold pressure is based on a torque capacity of the driveline disconnect clutch to rotate an engine at a desired cranking speed. The method includes where the speed is a maximum speed the motor rotates at when supplied power from an electric energy storage device at a maximum power limit of the electric energy storage device at present operating conditions.

The method of FIGS. 4 and 5 also provides for a powertrain operating method, comprising: commanding a motor to a speed via a controller, the speed based on an available amount of power that may be supplied by an electrical energy storage device at a time of an engine start request; and closing a driveline disconnect clutch via the controller in response to acceleration of the motor being less than a threshold a predetermined amount of time after commanding the motor to the speed. The method includes where the driveline disconnect clutch is positioned between an engine and the motor and further comprising commanding the driveline disconnect clutch to the closed position in further response to a line pressure of a transmission pump being greater than a threshold pressure. The method includes where commanding the driveline disconnect clutch to the closed position includes commanding the driveline disconnect clutch via a step change in commanded motor speed.

In some examples, the method includes where the motor is commanded to the speed in response to a degraded condition of the electric energy storage device. The method includes where the motor is commanded to the speed in response to a degraded condition of a low voltage starter motor. The method includes where the motor is commanded to the speed in response to a degraded condition of a belt integrated starter/generator. The method of claim 8, where the motor is commanded to the speed in response to a temperature of the motor being greater than a threshold temperature. The method includes where commanding the driveline disconnect clutch to the closed position occurs before the motor achieves the speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
   commanding a motor to a speed via a controller in response to an engine start request; and
   closing a driveline disconnect clutch via the controller in response to acceleration of the motor being less than a threshold after commanding the motor to the speed.

2. The method of claim 1, further comprising commanding gear clutches of a transmission to an open state in response to the engine start request.

3. The method of claim 2, further comprising deactivating an electric device in response to the engine start request.

4. The method of claim 3, where the electric device is a DC/DC converter.

5. The method of claim 1, further comprising closing the driveline disconnect clutch in further response to a line pressure output from a transmission pump exceeding a threshold pressure.

6. The method of claim 5, where the threshold pressure is based on a torque capacity of the driveline disconnect clutch to rotate an engine at a desired cranking speed.

7. The method of claim 1, where the speed is a maximum speed the motor rotates at when supplied power from an electric energy storage device at a maximum power limit of the electric energy storage device.

8. A powertrain operating method, comprising:
   commanding a motor to a speed via a controller, the speed based on an available amount of power that may be supplied by an electric energy storage device at a time of an engine start request; and
   closing a driveline disconnect clutch via the controller in response to acceleration of the motor being less than a threshold a predetermined amount of time after commanding the motor to the speed.

9. The method of claim 8, where the driveline disconnect clutch is positioned between an engine and the motor and further comprising commanding the driveline disconnect clutch to a closed position in further response to a line pressure of a transmission pump being greater than a threshold pressure.

10. The method of claim 9, where commanding the driveline disconnect clutch to the closed position includes commanding the driveline disconnect clutch via a step change in commanded motor speed.

11. The method of claim 9, where commanding the driveline disconnect clutch to the closed position occurs before the motor achieves the speed.

12. The method of claim 8, where the motor is commanded to the speed in response to a degraded condition of the electric energy storage device.

13. The method of claim 8, where the motor is commanded to the speed in response to a degraded condition of a low voltage starter motor.

14. The method of claim 8, where the motor is commanded to the speed in response to a degraded condition of a belt integrated starter/generator.

15. The method of claim 8, where the motor is commanded to the speed in response to a temperature of the motor being greater than a threshold temperature.

16. A system, comprising:
   an engine;
   a transmission coupled to the engine;
   a first motor/generator coupled to the engine via a belt;
   a second motor/generator positioned in a driveline between the engine and the transmission;
   a driveline disconnect clutch positioned in the driveline between the engine and the second motor/generator;
   an electric energy storage device electrically coupled to the second motor/generator; and
   a vehicle system controller including executable instructions stored in non-transitory memory to start the engine in a first mode via closing the driveline disconnect clutch in response to the electric energy storage device supplying power to the second motor/generator at a maximum power output limit of the electric energy storage device and a speed of the second motor/generator being within a threshold speed of a maximum speed of the second motor/generator when the second motor/generator is supplied electric power at the maximum power output limit of the electric energy storage device.

17. The system of claim 16, further comprising additional instructions to activate the first mode in response to a temperature less than a threshold.

18. The system of claim 17, further comprising additional instructions to start the engine in a second mode via rotating the first motor/generator.

19. The system of claim 16, further comprising additional instructions to start the engine in the first mode in response to degradation of the first motor/generator.

20. The system of claim 17, further comprising additional instructions to start the engine in the first mode in response to degradation of the electric energy storage device.

* * * * *